United States Patent
McGrath, Jr.

(10) Patent No.: US 6,875,500 B2
(45) Date of Patent: Apr. 5, 2005

(54) FLEXIBLE FLOORING SYSTEM

(76) Inventor: William H. McGrath, Jr., 1880 Perth Amboy Ave., Whiting, NJ (US) 08759

( * ) Notice: Subject to any disclaimer, the term of this patent is extended or adjusted under 35 U.S.C. 154(b) by 98 days.

(21) Appl. No.: 10/270,454

(22) Filed: Oct. 15, 2002

(65) Prior Publication Data

US 2004/0068950 A1 Apr. 15, 2004

(51) Int. Cl.⁷ .................................... E04C 1/00
(52) U.S. Cl. ................. 428/213; 52/480; 52/403.1; 52/309.1; 428/142; 428/159; 428/160; 428/353; 428/355 EP; 428/908.8; 524/361; 524/407
(58) Field of Search ............. 52/403.1, 309.1, 52/480; 472/92; 428/213, 304, 321, 403.1; 524/361, 407

(56) References Cited

U.S. PATENT DOCUMENTS

| | | | | |
|---|---|---|---|---|
| 3,765,972 A | * | 10/1973 | Wesp ...................... 156/71 |
| 4,018,961 A | * | 4/1977 | Noll ........................ 428/213 |
| 4,031,271 A | * | 6/1977 | Bush ...................... 430/277.1 |
| 4,265,957 A | * | 5/1981 | Severance et al. ......... 428/143 |
| 4,748,192 A | * | 5/1988 | Smith ...................... 521/107 |
| 5,470,893 A | * | 11/1995 | Sinclair-Day et al. ...... 523/205 |
| 6,093,497 A | * | 7/2000 | Wiemann et al. .......... 428/500 |
| 6,184,279 B1 | * | 2/2001 | Anderson et al. .......... 524/361 |
| 6,235,818 B1 | * | 5/2001 | Morizono et al. ........... 524/77 |
| 6,342,551 B1 | * | 1/2002 | Jolley et al. ............... 524/210 |
| 6,555,228 B2 | * | 4/2003 | Guritza ..................... 428/414 |
| 6,613,389 B2 | * | 9/2003 | Li et al. ................... 427/388.1 |
| 6,632,867 B1 | * | 10/2003 | Anderson et al. .......... 524/407 |

* cited by examiner

*Primary Examiner*—Carl D. Friedman
*Assistant Examiner*—Christy M. Green
(74) *Attorney, Agent, or Firm*—Charles I. Brodsky

(57) ABSTRACT

A flooring system for floors exhibiting surface movement, and/or for cushioning hard floors, which includes an epoxy or polyurethane primer, a two-component ambient temperature cured polyurethane membrane substrate base atop the primer of a urethane grade castor oil, polyether based polyol, a tin catalyst and a thickening agent, along with a polymeric isocyanate activator, and a polyurethane or polyurea, aromatic or aliphatic coating atop the substrate base, in providing a very tough, but flexibly soft non-cracking overlay which moves with the floor.

10 Claims, No Drawings

FLEXIBLE FLOORING SYSTEM

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to flooring systems, in general, and to a flexible flooring system for resurfacing floors which, in particular: (a) are subject to surface movement, or (b) need a tough, flexible surface.

2. Description of the Related Art

As is well known and understood, the commonly employed epoxy flooring systems installed in commercial and industrial establishments exhibit a very hard surface characteristic and frequently crack with surface movement of the underlying concrete. Various decorative finishes are possible. For example, the floor may be pigmented, decorative flakes may be added, or sand or rubber fines may be broadcast into the floor.

As is also well known, softer floors are available in commercial and industrial establishments with vinyl tile. However, such floorings are very expensive to maintain due to regularly needed waxing, buffing and stripping. Their typical useful life is only about 10 years.

SUMMARY OF THE INVENTION

As will become clear from the following description, the flooring system of the present invention is of an increased resilience to withstand extensive foot and vehicular traffic, is softer to walk upon, has a significantly long life expectancy under normal conditions, costs significantly less to maintain because no waxing, buffing or stripping is needed, and is seamless. Once applied, concrete movement does not result in any cracking—and, as will be seen, the flooring system can be provided in a variety of colors, or can be clear; can be broadcast with vinyl flakes to create a tough, decorative flooring system; and when employed with rubber fines, on the other hand, can be used outdoors or indoors as a non-skid, waterproof, flexible flooring system.

As will be seen, the flooring system of the invention comprises:

a. an epoxy or polyurethane primer;

b. a two-component ambient temperature cured polyurethane membrane substrate base atop the primer composed of: (1) a urethane grade castor oil, a polyether based polyol, a tin catalyst, a moisture scavenger and a thickening agent; and (2) a polymeric isocyanate activator; and c. an acrylic, or one or two-component polyurethane or polyurea coating atop the substrate base.

A method of cushioning hard flooring surfaces follows from the steps of:

a. first, sealing the surface with the primer;

b. applying the substrate base of this type atop the primer; and c. applying the coating atop the substrate base.

In a preferred manufacture and use, the substrate base is applied atop the primer by one of a pumping and pouring process, while the coating is applied atop the substrate base by one of a spraying or rolled down process.

As the flooring system of the invention is highly resilient and flexible, and resists cracking even with underlying concrete movement, its use in residential, commercial and industrial environments proves quite attractive. With the inclusion of different additives and different top coats, moreover, the flooring system becomes very decorative and easy to clean without waxing. With the inclusion of non-skid particles into the substrate base, it is particularly beneficial in harsh environments where slipping can be a major problem.

DETAILED DESCRIPTION OF THE INVENTION

The flexible flooring system of the invention includes three layers. First, an epoxy or polyurethane primer of any available composition is installed on the concrete or other floor. Second, a two-component ambient temperature cured polyurethane membrane substrate base is applied atop the primer by one of a pumping or pouring process. Third, a polyurea or polyurethane, aromatic or aliphatic top coat is applied atop the substrate base.

In accordance with the invention, such substrate base is comprised of two separate components: a resin side polyol blend; and, a polymeric isocyanate activator.

The polyol blend is composed of a polyether based polyol, a urethane grade castor oil, a tin catalyst, a moisture scavenger and a thickening agent. The mixture can be carried out in a large mixing vessel at room temperature. The liquid mixture part of the polyol blend contains a urethane grade castor oil to an extent of 60–70% by weight—for example, 65%. A castor oil of a very low moisture content is preferable to eliminate activation with the polyether based polyol. This polyol is then mixed with the castor oil in a proportion of 30% by weight. Polypropylene oxide is particularly useful as the polyether based polyol.

A tin catalyst is then added at a rate, for example, of 3 or 4 eye drops of the catalyst to some 16 oz. of the formulation. This serves to start the chemical reaction when the resin is added to the isocyanate. Use of dibutyltin dilaurate 2% by weight is sufficient, sold under such trade names as UL 28 and Dabco T-12.

As the polyether based polyol is susceptible to activation by moisture as well as by an isocyanate, a further modification of the resin side entails the use of a moisture scavenger added before the thickening agent. Such scavenger may here be comprised of Diamation Earth, to an extent of 3% by weight. The entire liquid mixture of castor oil, polypropylene oxide, dibutyltin dilaurate and Diamation Earth are then mixed at room temperatures up to 70–80° F. for approximately 20 minutes.

A powdered filler acts as a thickening agent in the polyol blend, which completes the basic resin side component. It serves to increase the viscosity of the polyol blend. To the completed liquid component of the polyol blend is added 45% by weight of the solid powder filler. For example, if the final liquid weighs one hundred pounds, forty five pounds of filler is added. Calcium carbonate or calcium silicate may be used as the thickening agent, slowly added while stirring for approximately 2 hours.

Air might still be trapped within this completed mixture. This is undesirable as it ultimately may give rise to small craters in the floor. Therefore, a de-gassing process is now employed while the blend is still in the mixing vessel. This is done by subjecting the mixture to a vacuum to remove the air. This process normally takes about 10 minutes to complete.

In accordance with the invention, the flexible flooring system employs a polymeric isocyanate as the curing agent for the resin side component of the substrate base. Methylene diphenyl di-isocyanate has been found particularly beneficial as the polymeric isocyanate. When the resin and isocyanate components are mixed together properly, the two-component ambient temperature cured polyurethane membrane substrate base so formed begins to gel in about 15 minutes. It is then pumped or poured onto the primer and back-rolled to level. The substrate base totally cures in about 3 to 4 hours. As will be appreciated by those skilled in the art, the substrate base may be applied to the primer to depths of from less than 1/16 of an inch to ½ inch or more in only one pass without the occurrence of foaming or de-gassing. Besides being flexible, soft, tough and seamless, the flexible flooring system as described can also be made decorative, or altered to serve a variety of purposes in residential, commercial and industrial establishments. Thus, for example, coloring agents can be added to the top coating, or to the substrate base while keeping the top coating clear. Vinyl flakes in a variety of colors can be added to the substrate base while still in its liquid state to yield a soft, decorative floor. Alternatively, rubber fines, colored or otherwise, can be added at such time so as to provide a non-skid surface for indoor or outdoor use. After total cure, the base can then be walked back on to sweep off any excess flakes, or alternatively, the rubber fines. If flakes are applied, one would now lightly sand any rough parts.

After the first two layers of primer and substrate base are applied, a polyurethane or polyurea, aromatic or aliphatic coating is then applied as a top coat. Such top coat may be applied by roller, or by spraying, with the top coat then being allowed to cure to the finished product.

The completed flooring system is flexible, seamless, odorless and smooth. With an aliphatic top coat, it will be highly resistant to sunlight and ultraviolet radiation. Maintenance costs are extremely low compared to other decorative floors because no waxing, buffing or stripping is necessary to maintain a clean, high gloss finished appearance. In addition, the flooring system continues to be flexible for many years—even at very low temperature.

While there have been described what are considered to be preferred embodiments of the present invention, it will be readily appreciated by those skilled in the art that modifications can be made without departing from the scope of the teachings herein. For example, the aforementioned system using a polyurea top coat will create a seamless, durable, long-lasting solution to replace the rubber mats that presently serve relatively ineffectively as flooring for skating rinks. For at least such reason, therefore, resort should be had to the claims appended hereto for a true understanding of the invention.

I claim:

1. A flexible flooring system for floors exhibiting surface movement comprising:
    an epoxy or urethane primer;
    a two-component ambient temperature cured polyurethane membrane substrate base atop said primer of a urethane grade castor oil, polyether based polyol, a tin catalyst and a thickening agent, along with a polymeric isocyanate activator;
    and a polyurethane polyurea, aromatic or aliphatic coating atop said substrate; and
    wherein said substrate base also includes a de-gassing agent.

2. The flexible flooring system of claim 1 wherein said substrate base is applied atop said primer by one of a pumping or pouring process.

3. The flexible flooring system of claim 1 wherein said substrate base is applied atop said primer to depths of from less than 1/16 of an inch to ½ inch or more in a single pass without foaming or degassing.

4. The flexible flooring system of claim 1 wherein said substrate base also includes a moisture scavenger to avoid moisture in the blend and prevent foaming.

5. The flexible flooring system of claim 1 wherein said coating is applied stop said base by one of a spraying or rolled-down process.

6. The flexible flooring system of claim 1, also including a layer of vinyl flakes applied to said substrate base while still in its liquid state before total cure.

7. The flexible flooring system of claim 1, also including a layer of rubber fines applied to said substrate base while still in its liquid state before total cure.

8. The flexible flooring system of claim 1 wherein said substrate base is pigmented.

9. The flexible flooring system of claim 1 wherein said coating is pigmented.

10. The flexible flooring system of claim 1 wherein said coating is clear.

* * * * *